(12) United States Patent
Fujita et al.

(10) Patent No.: US 7,538,836 B2
(45) Date of Patent: May 26, 2009

(54) CIRCULARLY POLARIZING PLATE AND LIQUID CRYSTAL DISPLAY DEVICE

(75) Inventors: Kenji Fujita, Mie (JP); Takayuki Natsume, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 465 days.

(21) Appl. No.: 11/103,505

(22) Filed: Apr. 12, 2005

(65) Prior Publication Data

US 2005/0231660 A1  Oct. 20, 2005

(30) Foreign Application Priority Data

Apr. 16, 2004 (JP) .............................. 2004-122087
Mar. 4, 2005 (JP) .............................. 2005-061358

(51) Int. Cl.
*G02F 1/1335* (2006.01)

(52) U.S. Cl. ...................................................... 349/98

(58) Field of Classification Search .................... 349/98, 349/120
See application file for complete search history.

(56) References Cited

U.S. PATENT DOCUMENTS

| | | | |
|---|---|---|---|
| 6,295,109 B1 | 9/2001 | Kubo et al. | |
| 6,762,811 B2 * | 7/2004 | Sasaki et al. | 349/118 |
| 6,922,222 B2 * | 7/2005 | Miyachi et al. | 349/118 |
| 7,163,724 B2 * | 1/2007 | Elman et al. | 428/1.3 |
| 7,250,200 B2 * | 7/2007 | Elman | 428/1.3 |

| | | | |
|---|---|---|---|
| 2001/0048497 A1 | 12/2001 | Miyachi et al. | |
| 2005/0225706 A1 | 10/2005 | Miyachi et al. | |

FOREIGN PATENT DOCUMENTS

| | | |
|---|---|---|
| JP | 10-068816 | 3/1998 |
| JP | 10-68816 | 3/1998 |
| JP | 10-206636 | 8/1998 |
| JP | 2000-035570 | 2/2000 |
| JP | 2002-55342 A | 2/2002 |
| JP | 2003-207620 | 7/2003 |
| JP | 2003-248121 | 9/2003 |
| JP | 2003-315541 | 11/2003 |

OTHER PUBLICATIONS

Third party observation of JP priority application 2005-061358 dated Jun. 26, 2007.
Sharp Technical Journal, vol. 85, Apr. 2003, pp. 19-23 with table of contents, cover page, and publication details.

* cited by examiner

*Primary Examiner*—David Nelms
*Assistant Examiner*—Nathanael R Briggs
(74) *Attorney, Agent, or Firm*—Nixon & Vanderhye P.C.

(57) ABSTRACT

The present invention provides a circularly polarizing plate comprising a polarizer and an optical layer having a value 5 of $N_z$ shown by the following equation (1), wherein the circularly polarizing plate comprises a birefringent body satisfying $N_z<0$ between the polarizer and a retarder satisfying $N_z>0$. $N_z=(n_x-n_z)/(n_x-n_y)(1)$, where $n_x$ and $n_y$ designates main refractive indexes in a plane to light having a wavelength of 550 nm and satisfy $n_x \geq n_y$, and $n_z$ designates a main refractive index in a thickness direction to the light having the wavelength of 550 nm.

9 Claims, 12 Drawing Sheets

⑤ Viewing angle compensation layer
(C-Plate) (Re=0nm, Rth=110nm
nx=1.514, ny=1.514, nz=1.51)
④ λ/4 retarder (Re=140nm, Nz=1.0
slow phase axis 30°)
③ λ/2 retarder (Re=270nm, Nz=1.0
slow phase axis 150°)
② Positive retarder (Re=0nm, Rth=−50nm
nx=1.50, ny=1.50, nz=1.505)
① Polarizer (absorption axis 135°)

Fig.8-c
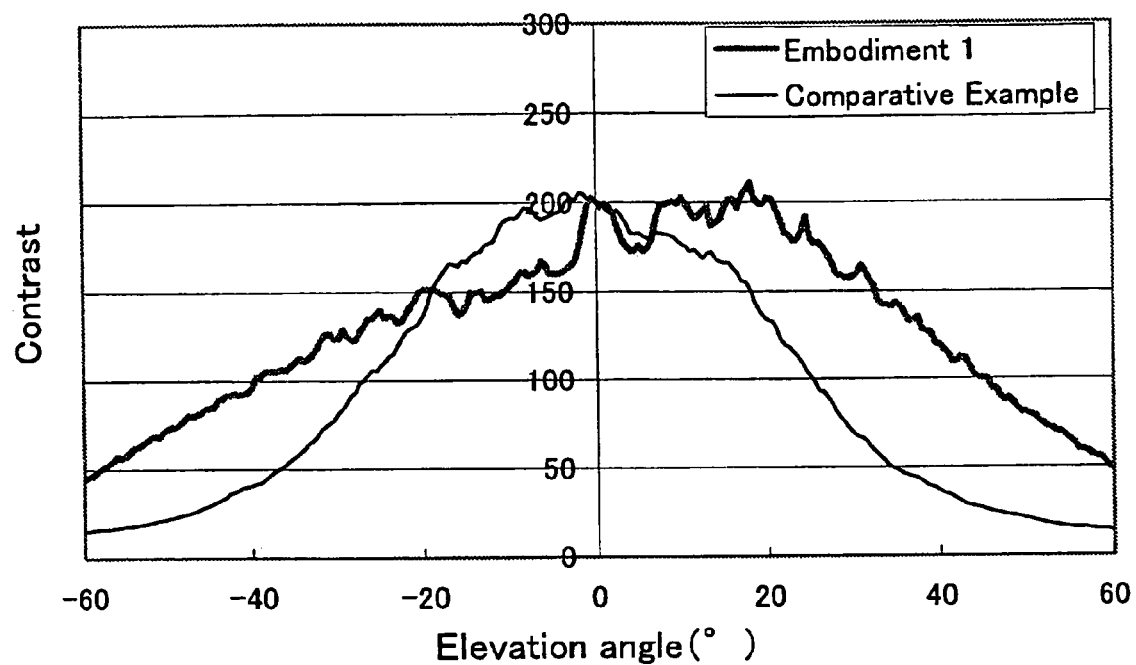

- ■ No positive retarder
  No TAC
- □ Embodiment 1
  Positive retarder(Rth=−50nm)
  No TAC
- × No positive retarder
  TAC(Rth=50nm)

- ■ No positive retarder
  No TAC
- □ Embodiment 1
  Positive retarder(Rth=−50nm)
  No TAC
- × No positive retarder
  TAC(Rth=50nm)

Equal contrast ratio contour

Equal contrast ratio contour

Equal contrast ratio contour

US 7,538,836 B2

CIRCULARLY POLARIZING PLATE AND LIQUID CRYSTAL DISPLAY DEVICE

REFERENCE TO RELATED APPLICATION

This Nonprovisional application claims priority under 35 U.S.C. § 119 (a) on Patent Application No. 2004-122087 filed in Japan on Apr. 16, 2004 and Patent Application No. 2005-61358 filed on Mar. 4, 2005, the entire contents of which are hereby incorporated by reference.

BACKGROUND

1. Field of the Technology

The technology presented herein relates to a circularly polarizing plate and a liquid crystal display device. More particularly, it relates to a circularly polarizing plate which is suitable for a semitransparent vertically aligned (VA) liquid crystal display device or others, and a liquid crystal display device comprising the circularly polarizing plate.

2. Description of the Related Art

A circularly polarizing plate is widely used in a display device such as a liquid crystal display device as an optical member for converting incident light to circularly polarized light. In a liquid crystal display device used in a mobile device such as a cellular phone, a PDA (Personal Digital Assistant) and the like, high luminance, high resolution and low consumption power are necessary. As a display method satisfying these characteristics, a semitransparent display method which implements a display by switching between transparent display mode and reflection display mode or using those modes together has attracted attention. In the semitransparent liquid crystal display device using such semitransparent display method, use of the circularly polarizing plate enables both transparent display and reflection display. That is, in order to implement transparent display and reflection display at the same time in the liquid crystal display device, it is necessary to form a liquid crystal layer having a so-called multigap structure and to use the circularly polarizing plate comprising at least one polarizer (linearly polarizing plate) and one wavelength plate (retarder) as a polarization element. In this respect, performance of the circularly polarizing plate deeply affects display characteristics.

A previous circularly polarizing plate generally comprises a polarizer and a λ/4 retarder (which generates retardation of almost ¼ wavelength in light wave of a set wavelength). According to the previous circularly polarizing plate, in order to prevent discoloration of a gradation display and a black display in a liquid crystal display, it is necessary to control wavelength dispersion of the retardation, that is, to keep characteristics of a wavelength plate in different wavelengths, and to prevent reduction of display quality at the time of increase of a field of view (an elevation angle). On the other hand, as a technique to control the wavelength dispersion of the retardation, proposed is a technique in which a ¼ wavelength plate (λ/4 retarder) and a ½ wavelength plate (λ/2 retarder which generates retardation of almost ½ wavelength in light wave of a set wavelength) are bonded at a predetermined angle to provide a λ/4 retarder having a small wavelength dispersion of retardation (refer to Japanese Kokai Publication Hei-10-68816 (p. 1-5, FIG. 1), for example). According to this technique, wavelength dispersion of the retardation may be controlled by bonding the λ/2 retarder and the λ/4 retarder so that respective stretch axes form an appropriate angle. As a result, linearly polarized light may be circularly polarized light in a large wavelength band. In addition, a constitution of a semitransparent liquid crystal display device comprising the circularly polarizing plate having the above constitution is disclosed (refer to Japanese Kokai Publication 2000-35570 (p. 1-9, FIG. 1) and its correspondent U.S. Pat. No. 6,295,109 B1 (FIG. 17), for example).

However, in the above circularly polarizing plate having the constitution in which the λ/2 retarder is added, viewing angle dependence of retardation of the λ/2 retarder is great, which could reduce a field of view of the circularly polarizing plate. That is, in the stacked circularly polarizing plate comprising a plurality of retarders, since light incident from an oblique direction on the circularly polarizing plate is converted to elliptically polarized light which is largely different from perfect circularly polarized light, a viewing angle of a liquid crystal display device could be small. Therefore, in the circularly polarizing plate having the constitution in which the λ/2 retarder is added, there is room for improvement to reduce the viewing angle dependence.

To widen a viewing angle of a TN (twisted nematic) type liquid crystal display device, proposed is a technique which uses an optical compensation film with an inclined optical indicatrix (refer to "Technology of the GRP Formula for Wide-Viewing-Angle LCDs", by Motohiro Yamahara and three other persons, Sharp Technical Journal, Sharp Corp., April 2003, No. 85, p. 19-23, for example). In addition, with respect to a technique which polarizes light incident from a light source through a circularly polarized light separating layer, a polarization element comprising at least one retarder and one circularly polarized light separating layer having predetermined characteristics is disclosed as means for improving light usage efficiency in the liquid crystal display devices (Japanese Kokai Publication 10-206636 (p. 1-10, FIGS. 1-5), for example). The circularly polarized light separating layer used herein has a function of passing right-handed circularly polarized light and reflecting left-handed circularly polarized light, for example. This polarization element is disposed between a polarizing plate and a backlight and used as a film for increasing a luminance in the liquid crystal display device. In this polarization element, the retarder prevents light incident from an oblique direction from being colored by the circularly polarized light separating layer.

However, there is room for improvement in these techniques so that the viewing angle characteristic is improved by converting light incident from the oblique direction to more perfect circularly polarized light in the circularly polarizing plate having a function of converting incident light to circularly polarized light.

SUMMARY

The example embodiment presented herein was made in view of the above problems and it is a feature of the example embodiment to provide a circularly polarizing plate in which a wide viewing angle may be provided, and a liquid crystal display device using the circularly polarizing plate.

The inventors of the example embodiment presented herein have studied the circularly polarizing plate comprising a polarizer and an optical layer such as a retarder and focused attention on viewing angle dependence of the retarder. And they found that the retarder satisfying $N_z>0$, wherein $N_z$ shown by the following equation (1), is used in the constitution in which the λ/2 retarder is added in order to control the wavelength dispersion of the retardation, for example. And they also found that the viewing angle dependence of the retarder satisfying $N_z>0$ may be compensated by providing a birefringent body satisfying $N_z<0$ between the polarizer and the retarder satisfying $N_z>0$, and the viewing angle characteristic of the circularly polarizing plate may be improved. Thus, the example embodiment was made and completed to solve the above problems.

That is, the example embodiment provides a circularly polarizing plate comprising a polarizer and an optical layer having a value of $N_z$ shown by the following equation (1), wherein the circularly polarizing plate comprises a birefringent body satisfying $N_z<0$ between the polarizer and a retarder satisfying $N_z>0$.

$$N_z=(n_x-n_z)/(n_x-n_y) \qquad (1)$$

where $n_x$ and $n_y$ designates main refractive indexes in a plane to light having a wavelength of 550 nm and satisfy $n_x \geqq n_y$, and $n_z$ designates a main refractive index in a thickness direction to the light having the wavelength of 550 nm.

BRIEF DESCRIPTION OF THE DRAWINGS

FIG. 8b is a perspective exploded view schematically illustrating a constitution of the circularly polarizing plate illustrated in FIG. 8a.

FIG. 8c is a graph showing a relation between the elevation angle θ of the incident light and contrast in Embodiment 1.

Figure 1:
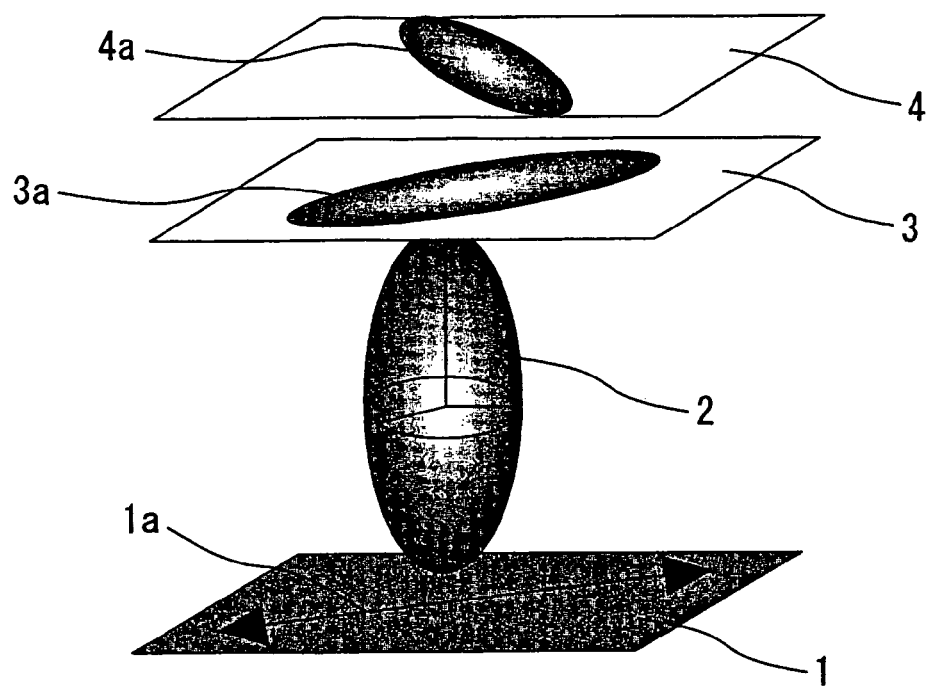
FIG. 1 is a perspective exploded view schematically illustrating an example of a constitution of a circularly polarizing plate in an example embodiment.

EXPLANATION OF NUMERALS AND SYMBOLS 1, 11: Polarizer
1a, 11a: Transmission axis of polarizer
2, 12: Birefringent body satisfying $N_z<0$
12a: Positive retarder
3, 13: λ/2 retarder
3a: Optical indicatrix of λ/2 retarder
4, 14: λ/4 Retarder
4a: Optical indicatrix of λ/4 retarder
5, 15: Circularly polarizing plate (comprising a birefringent body satisfying $N_z<0$)
5a, 15a: Circularly polarizing plate (comprising no birefringent body satisfying $N_z<0$)
6,16: Viewing angle compensation layer
10: Liquid crystal cell

PREFERRED EMBODIMENTS

A circularly polarizing plate according to an example embodiment comprises a polarizer and an optical layer having a value of $N_z$ shown by the following equation (1). According to the example embodiment, light incident on the circularly polarizing plate is linearly polarized by the polarizer and further circularly polarized by the optical layer. Although the circularly polarizing plate of the present invention preferably provides the perfect circularly polarized light, any of the circularly polarizing plates to substantially circularly polarize the light may be sufficient as long as effects of the invention is exhibited. More specifically, the circularly polarizing plate may be sufficient by which circularly polarized light has ellipticity (ratio of a short diameter to a long diameter in ellipse) of 0.85 or more in a visible light range (wavelength is 380 to 780 nm) is provided. Preferably, the circularly polarizing plate provides circularly polarized light having ellipticity of 0.85 or more in a range of wavelength 400 to 700 nm.

The polarizer is not particularly limited as long as it has a function of passing only a specific polarization component in the incident light. For example, the polarizer may have a polarizing layer that comprises a polyvinyl alcohol (referred to as PVA occasionally hereinafter) containing dichroic material such as iodine and dichroic dye. A support layer comprising triacetylcellulose (referred to as TAC occasionally hereinafter) and the like is disposed on the polarizer according to need. The support layer is used as a bonding agent to bond the polarizer and the optical layer or used for improvement in durability of the polarizer.

The optical layer having the value of $N_z$ shown by the following equation (1) in the circularly polarizing plate comprises at least a retarder satisfying $N_z>0$ and a birefringent body satisfying $N_z<0$ $$N_z=(n_x-n_z)/(n_x-n_y) \qquad (1)$$

where $n_x$ and $n_y$ designate main refractive indexes in a plane to light having a wavelength of 550 nm and satisfy $n_x \geqq n_y$, and $n_z$ designates a main refractive index in a thickness direction to the light having the wavelength of 550 nm.

In addition, in the case of $n_x>n_y$, when $N_z>1$, $n_x>n_y>n_z$ is satisfied, when $N_z=1$ is satisfied, $n_x>n_z=n_y$ is satisfied, when $1>N_z>0$ is satisfied, $n_x>n_z>n_y$ is satisfied, when $N_z=0$ is satisfied, $n_x=n_z>n_y$ is satisfied, and when $N_z<0$ is satisfied, $n_z>n_x>n_y$ is satisfied. In the case of $n_x=n_y$, $N_z$ cannot be calculated by the above equation (1), but when $n_x=n_y<n_z$ is satisfied, $N_z$ is negative infinity. The birefringent body satisfying $n_z>n_x=n_y$ is a so-called positive retarder; a positive birefringent body having an optical axis in a thickness direction. Thus, the birefringent body satisfying $N_z<0$ is one satisfying $n_z>n_x\geqq n_y$.

The retarder satisfying $N_z>0$ is not particularly limited as long as it has a function of changing a polarized state of incident light. It is preferable that the retardation of the retarder satisfying $N_z>0$ is adjusted so that circularly polarized light may be provided from linearly polarized incident light or elliptically polarized incident light. More preferably, the retardation is adjusted so that the circularly polarized light can be provided from the linearly polarized incident light from the perpendicular direction. As a material of the retarder satisfying $N_z>0$, used are polycarbonate, polynorbornene, polysulfone, polymethyl methacrylate and the like. In addition, according to the example embodiment, the retarder satisfying $N_z>0$ may have a single-layer structure or a multilayer structure comprising two or more layers.

The above circularly polarizing plate comprises the birefringent body satisfying $N_z<0$ between the polarizer and the retarder satisfying $N_z>0$.

According to the example embodiment, since the birefringent body satisfying $N_z<0$ is provided as above, viewing angle dependence of circularly polarizing plate caused by the retarder satisfying $N_z>0$ may be compensated and the circularly polarized light may be provide from light incident from the perpendicular direction and that incident from the oblique direction. In addition, according to the example embodiment, since the retarder satisfying $N_z>0$ and the birefringent body satisfying $N_z<0$ are combined, provided is larger compensation effect of viewing angle dependence than that in the case where a biaxially orientated retarder having three-dimensional refractive index which is like the combination of the retarder satisfying $N_z>0$ and the birefringent body satisfying $N_z<0$. According to such the circularly polarizing plate of the example embodiment presented herein, a wide viewing display may be implemented in a display device such as a liquid crystal display device.

A principle in which the birefringent body satisfying $N_z<0$ can improve the viewing angle will be described with reference to the drawings hereinafter.

Figure 2:
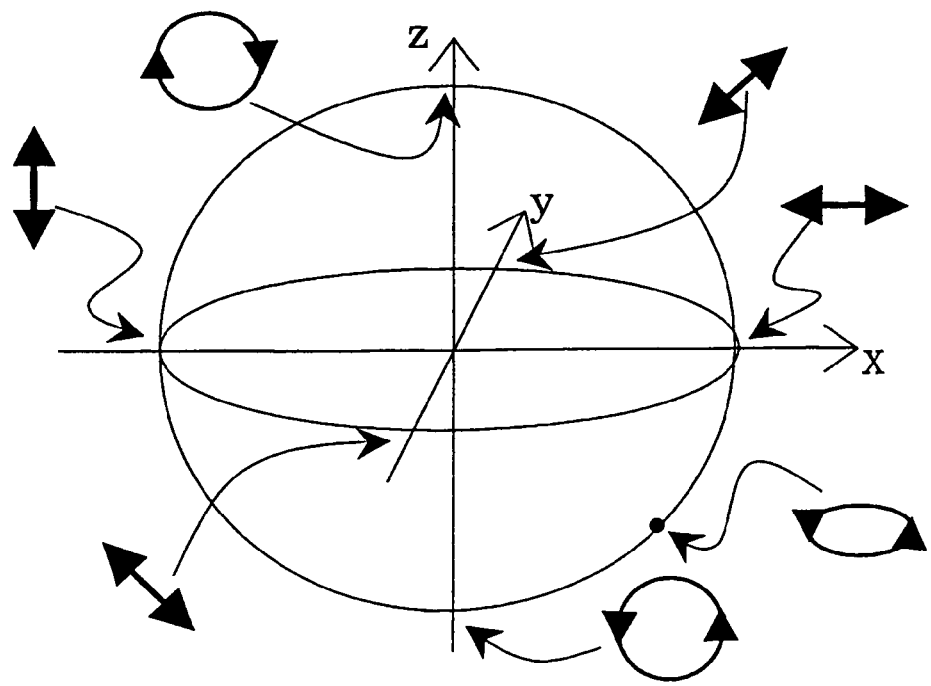
FIG. 2 is an explanatory diagram of Poincare sphere.

In order to facilitate design of the circularly polarizing plate, a concept of Poincare sphere is employed. Poincare sphere is, as illustrated in FIG. 2, a sphere having a radius $S_0$ (intensity) when $S_1$, $S_2$ and $S_3$ are axes of an orthogonal coordinate system (x axis, y axis and z axis in FIG. 2) among stokes parameters $S_0$, $S_1$, $S_2$ and $S_3$ expressing a polarized state of light. A point on the surface of Poincare sphere represents a polarized state of light. When Poincare sphere is regarded as the earth, a point on the equator designates linearly polarized light, and two points on the north pole and the south pole designate right-handed circularly polarized light and left-handed circularly polarized light, respectively. In addition, the longitude designates twice of an elliptic long-axis azimuthal angle, an intersecting point of Poincare sphere with a positive side of the x axis designates linearly polarized light which vibrates in the horizontal direction, and an intersecting point of Poincare sphere with a negative side of x axis designates linearly polarized light which vibrates in the vertical direction. Furthermore, an intersecting point of Poincare sphere with y axis designates linearly polarized light which vibrates in the direction inclined at 45° or −45°.

Figure 3:
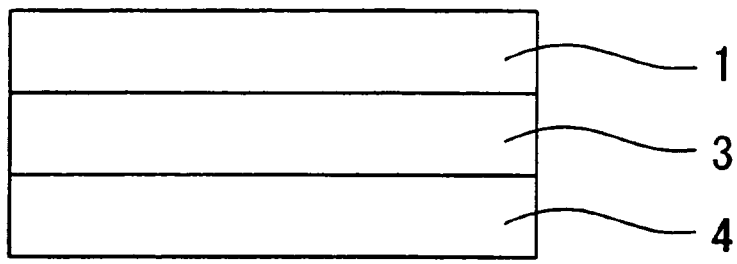
FIG. 3 is a schematic sectional view illustrating an example of a constitution of a previous circularly polarizing plate.
Figure 4:
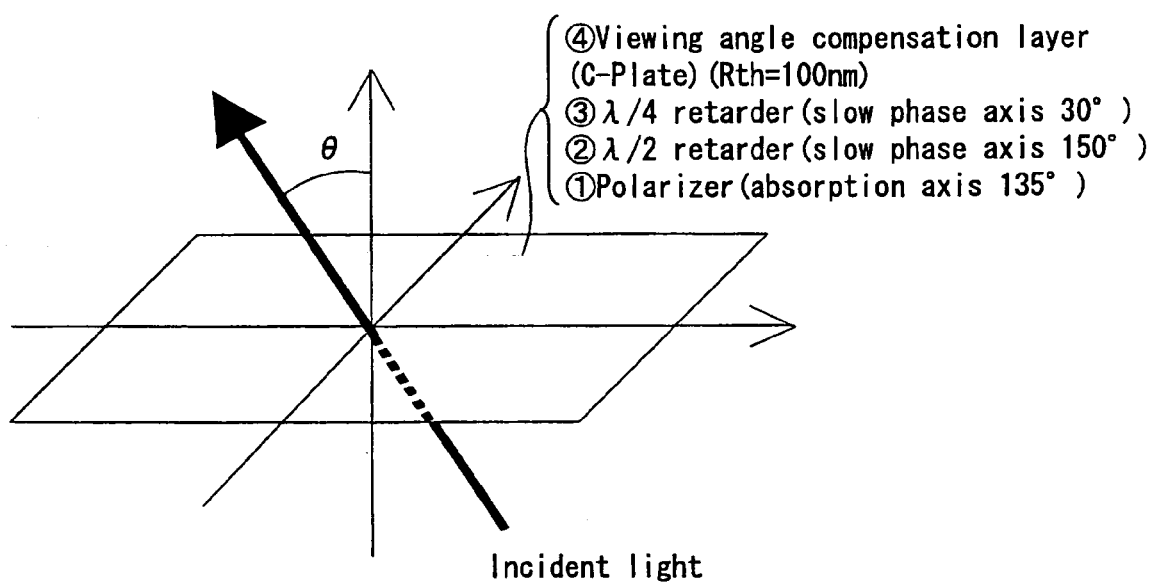
FIG. 4 is an explanatory diagram schematically illustrating pass of light having an elevation angle θ through the previous circularly polarizing plate disposed on a backlight side. Wherein circled numerals show an order in which the light enters each member.
Figure 5:
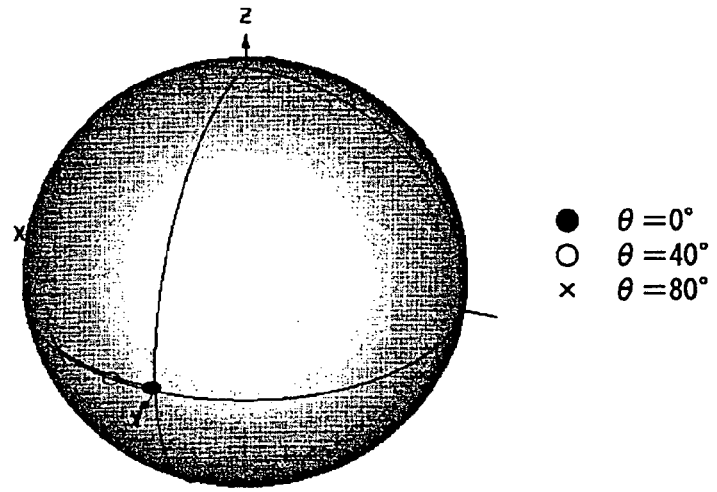
FIG. 5 is an explanatory diagram showing, by Poincare sphere, a polarized state of light after passing through the polarizer in the previous circularly polarizing plate illustrated in FIG. 3.
Figure 6:
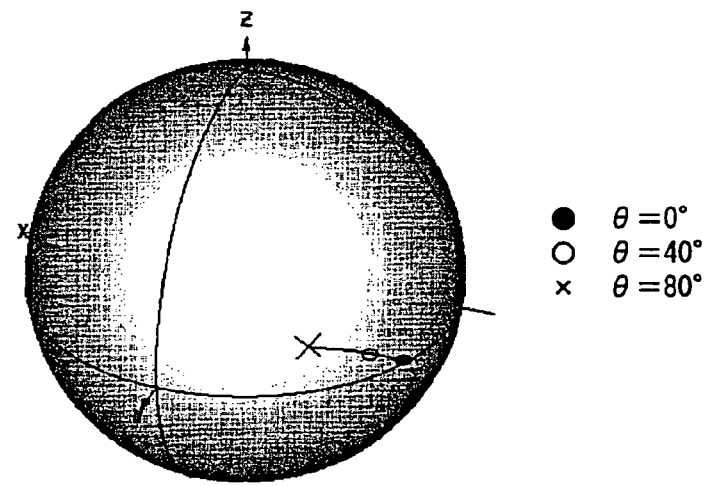
FIG. 6 is an explanatory diagram showing, by Poincare sphere, a polarized state of light after passing through the λ/2 retarder in the previous circularly polarizing plate illustrated in FIG. 3.
Figure 7:
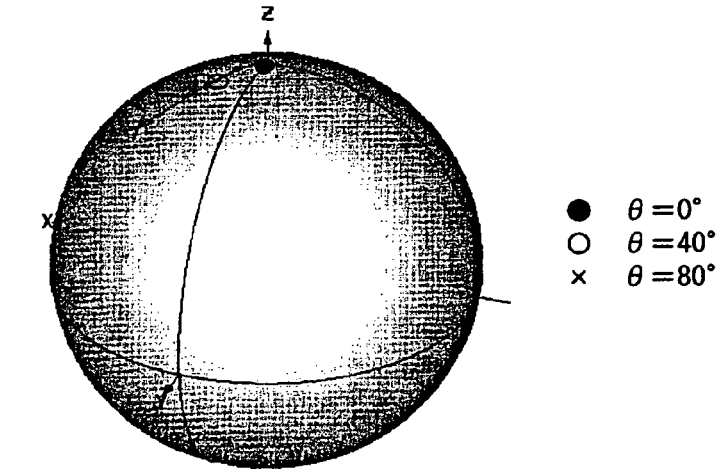
FIG. 7 is an explanatory diagram showing, by Poincare sphere, a polarized state of light after passing through a λ/4 retarder in the previous circularly polarizing plate illustrated in FIG. 3.

Meanwhile, in order to implement the transparent display and reflection display in the liquid crystal display device, use of the circularly polarizing plate is needed. The circularly polarizing plate comprises a polarizer and a λ/4 retarder basically. When a polarizer 1, a λ/2 retarder 3, and a λ/4 retarder 4 are laminated in the circularly polarizing plate as illustrated in FIG. 3, the circularly polarizing plate can correspond to wider wavelength band and prevent coloration in the display. And so, taking the circularly polarizing plate having the constitution illustrated in FIG. 3 as an example, polarized state of light having elevation angles θ (θ=0°, 40°, 80°) after passing through the circularly polarizing plate comprising two retarders before entering the liquid crystal display panel is examined as illustrated in FIG. 4. The light has linearly polarized state after passing through the polarizer 1, as shown on the surface of the Poincare sphere in FIG. 5. Then, after passing through the λ/2 retarder 3, it has polarized state shown in FIG. 6. It is found that when the elevation angle θ is 0°, it has linearly polarized state showed on an x-y plane on Poincare sphere and as the elevation angle θ is increased, the light has elliptically polarized state. And then the light has polarized state shown in FIG. 7 after passing through the λ/4 retarder 4. When the elevation angle θ is 0°, it has perfect circularly polarized state after passing through the λ/4 retarder. However, when the elevation angle θ is increased, the light has elliptically polarized state after passing through the λ/2 retarder, and the perfect circularly polarized light may not be provided after passing through the λ/4 retarder. Therefore, if the incident light having the elevation angle θ of 0° or more can become the perfect circularly polarized light after passing though the λ/4 retarder 4, the viewing angle of the liquid crystal display maybe widened. Thus, according to the example embodiment presented herein, this may be implemented by providing the birefringent body 2 satisfying $N_z<0$ between the polarizer 1 and the λ/2 retarder 3 in the circularly polarizing plate as illustrated in FIG. 1, leading to improvement in a viewing angle characteristic. In addition, in FIG. 1, the birefringent body 2 satisfying $N_z<0$ is illustrated as an optical indicatrix.

Preferably, the $N_z$ value of the birefringent body satisfying $N_z<0$ is appropriately designed depending on the characteristic of $N_z$ value of the retarder satisfying $N_z>0$ which performs the viewing angle compensation. More specifically, it is preferable that an upper limit of the $N_z$ value of the birefringent body satisfying $N_z<0$ is set at −1 in order to sufficiently provide the effect of the viewing angle compensation. A material of the birefringent body satisfying $N_z<0$ is not particularly limited as long as desired three-dimensional refractive index can be provided. Thus, used be polycarbonate, polynorbornene, polysulfone, polymethyl methacrylate and the like.

A position of the birefringent body satisfying $N_z<0$ is not particularly limited as long as it is positioned between the polarizer and the retarder satisfying $N_z>0$, and the birefringent body satisfying $N_z<0$ is preferably adjacent to the polarizer and/or the retarder satisfying $N_z>0$. Thus, the effect of reducing the viewing angle dependence of the retarder satisfying $N_z>0$ may be more sufficiently exhibited.

In constitution of the circularly polarizing plate of the example embodiment, other components may be comprised as long as the circularly polarizing plate essentially comprises the above-mentioned components. For example, a protection film, an interlayer bonding agent layer, a separator layer and the like may be comprised according to need. The interlayer bonding agent layer is not particularly limited as long as it can be provided among the polarizer, the retarder satisfying $N_z>0$, the birefringent body satisfying $N_z<0$ and the like, and can bond them. For example, the interlayer bonding agent layer comprising an acrylic bonding agent may be used. In addition, the protection film and the separator layer are not particularly limited as long as they are provided to protect the surface of the circularly polarizing plate. For example, the separator layer given a demolding operation on a surface of a polyethylene terephthalate (PET) film may be used.

Preferred configurations of the circularly polarizing plate according to the example embodiment will be described in detail hereinafter. As preferred configuration of the birefringent body satisfying $N_z<0$, included are (1) A configuration
wherein in-plane retardation Re is 50 nm or less, and
(2) A configuration
wherein the in-plane retardation Re satisfies 50 nm$\leq$Re$\leq$150 nm, and
an angle P1 formed between an optical axis in a plane of the birefringent body and an absorption axis of the adjacent polarizer satisfies one of $85°\leq P1\leq 95°$ and $0°\leq P1\leq 5°$ (an optical axis in a plane of the birefringent body is positioned so as to cross within $\pm 5°$ from right angles or so as to be within $\pm 5°$ from parallel to an adjacent absorption axis of the polarizer).

In addition, the in-plane retardation Re is provided by the following equation (2).

$$Re=(n_x-n_y)\times d \qquad (2)$$

where $n_x$ and $n_y$ designate main refractive indexes in the plane to the light having a wavelength of 550 nm, and a relation $n_x\geq n_y$ is satisfied, and d designates a thickness of the birefringent body satisfying $N_z<0$.

According to the circularly polarizing plate of the example embodiment, the birefringent body satisfying $N_z<0$ preferably has a configuration in which the lineally polarized incident light from the perpendicular direction is not retarded. Thus, when the birefringent body satisfying $N_z<0$ having the above configuration is combined with the retarder satisfying $N_z>0$ having the retardation adjusted so as to circularly polarize the linearly polarized incident light from the perpendicular direction, sufficient exhibition of effect reducing the viewing angle dependence is realized. That is, the light incident from the perpendicular direction on the circularly polarizing plate having the combined configuration is converted to linearly polarized light by the polarizer and passes through the birefringent body satisfying $N_z<0$ without being retarded, and is circularly polarized by the retarder satisfying $N_z>0$. In addition, the light incident from the oblique direction is linearly polarized by the polarizer, and is elliptically polarized by predetermined retardation of the birefringent body satisfying $N_z<0$ and emitted, and is circularly polarized by the retarder satisfying $N_z>0$.

According to the configuration (1), since the in-plane retardation Re is 50 nm or less, optical isotropy is provided in the plane, and the retardation is not provided with the linearly polarized light incident from the perpendicular direction. Performing simulations on a contrast ratio of the liquid crystal display devices comprising the circularly polarizing plate of the example embodiment, it is found that when the in-plane retardation Re is 50 nm or less, even when the optical axis is in any direction, a front contrast ratio may be kept 10 or more. A more preferably upper limit of the in-plane retardation Re in the above configuration (1) is 20 nm. At this time, the front contrast ratio may be 50 or more, and more sufficient display quality may be provided.

In addition, according to the configuration (2), although the in-plane retardation Re satisfies 50 nm$\leq$Re$\leq$150 nm and the optical isotropy is not provided in the plane, the retardation is not applied to linearly polarized light incident from the perpendicular direction because an angle P1 formed between an optical axis in a plane of the birefringent body and an absorption axis of the adjacent polarizer satisfies one of $85°\leq P1\leq 95°$ and $0°\leq P1\leq 5°$ and the linearly polarized light incident from the perpendicular direction is positioned so as to cross at right angles or so as to be parallel to the optical axis of the birefringent body satisfying $N_z<0$. The contrast ratio of the liquid crystal display device comprising the circularly polarizing plate of the example embodiment is calculated in a simulation. When the in-plane retardation Re satisfies 50 nm$\leq$Re$\leq$150 nm and an angle P1 formed between an optical axis in a plane of the birefringent body and an absorption axis of the adjacent polarizer satisfies one of $85°\leq P1\leq 95°$ and $0°\leq P1\leq 5$, the front contrast ratio is kept at 10 or more.

As preferred configurations of the retarder satisfying $N_z>0$, included are (3) A configuration
wherein a $\lambda/4$ retarder is contained, and
(4) A configuration
wherein a $\lambda/2$ retarder is further contained.

In these configurations (3) and (4), the linearly polarized light incident from the perpendicular direction and the elliptically polarized light incident from the oblique direction may be circularly polarized by the $\lambda/4$ retarder. In addition, in the above configuration (4), wavelength dispersion of the retardation in the $\lambda/4$ retarder is controlled by the $\lambda/2$ retarder, and the viewing angle dependence of the $\lambda/2$ retarder is sufficiently compensated by the birefringent body satisfying $N_z<0$, and wider viewing angle may be provided.

And the $\lambda/4$ retarder herein used means a retarder having the front retardation of almost ¼ wavelength (95 to 195 nm), in a visible light region (wavelength is 380 to 780 nm), and preferably has the front retardation of 100 to 180 nm. Also, the $\lambda/2$ retarder herein used means a retarder having the front retardation of almost ½ wavelength (190 to 390 nm), in the visible light region, and the front retardation is preferably 220 to 340 nm.

The circularly polarizing plate in the configuration (3) preferably comprises a polarizer, a birefringent body satisfying $N_z<0$, and the $\lambda/4$ retarder satisfying $N_z>0$ in this order. The circularly polarizing plate in the configuration (4) preferably comprises a polarizer, a birefringent body satisfying $N_z<0$, the $\lambda/2$ retarder and the $\lambda/4$ retarder in this order. In this configuration (4), at least one of the $\lambda/2$ retarder and the $\lambda/4$ retarder may satisfy $N_z>0$, and the birefringent body satisfying $N_z<0$ may be provided between the $\lambda/2$ retarder and the $\lambda/4$ retarder. In the configuration (4), when an angle formed between optical axes of the $\lambda/2$ retarder and the $\lambda/4$ retarder is set at P2, 50°<P2<70° is preferably satisfied. Thus, The wavelength dispersion of the retardation of the λ/4 retarder may be more effectively controlled.

In the configuration (3) and (4), (5) A configuration wherein the λ/2 retarder and/or the λ/4 retarder satisfy $0.8 \leq N_z \leq 2$, and front retardation $R_{th}$ in a thickness direction of the birefringent body satisfying $N_z<0$ satisfies $-140$ nm$\leq R_{th} \leq -20$ nm and, (6) A configuration wherein the polarizer comprises the support layer having front retardation $R_{th}$ in a thick direction of more than 0, the λ/2 retarder and/or the λ/4 retarder satisfies $0.8 \leq N_z \leq 2$, and front retardation $R_{th}$ in a thickness direction of the birefringent body satisfying $N_z<0$ satisfies $-220$ nm$\leq R_{th} \leq -40$ nm is more preferable.

These configurations (5) and (6) are suitable in the case where the circularly polarizing plate according to the example embodiment is disposed on each side of the liquid crystal display panel. In addition, the front retardation $R_{th}$ in the thickness direction is provided by the following equation (3).

$$R_{th} = \{(n_x + n_y)/2 - n_z\} \times d \qquad (3)$$

In the equation (3), $n_x$ and $n_y$ designate main refractive indexes in the plane to the light having a wavelength of 550 nm, $n_z$ designates a main refractive index in the thickness direction to the light having a wavelength of 550 nm, and d designates a thickness of the birefringent body satisfying $N_z<0$.

According to the configuration (5), since the birefringent body satisfying $N_z<0$ is constituted so as to satisfy $-140$ nm$\leq R_{th} \leq -20$ nm, the viewing angle dependence caused by the λ/2 retarder and/or the λ/4 retarder may be sufficiently compensated. Above all, the viewing angle dependence of the retarder adjacent to the birefringent body satisfying $N_z<0$ may be more sufficiently compensated. When the contrast ratio of the liquid crystal display device comprising the circularly polarizing plates having the configurations (3) and (4) is examined in simulation, it is found that when the birefringent body satisfying $N_z<0$ satisfies $-140$ nm$\leq R_{th} \leq -20$ nm, the contrast ratio of the liquid crystal display device may be 10 or more at an elevation angle θ of 80°. A lower limit of the front retardation $R_{th}$ in the thickness direction of the birefringent body satisfying $N_z<0$ having the configuration (5) is more preferably $-120$ nm, and its upper limit is preferably $-40$ nm. At this time, the contrast ratio of the liquid crystal display device can be 20 or more at an elevation angle θ of 80°.

According to the configuration (6), the polarizer comprises a support layer made of triacetylcellulose (TAC) and the like, and the front retardation $R_{th}$ in the thickness direction of the birefringent body satisfying $N_z<0$ satisfies $-220$ nm$\leq R_{th} \leq -40$ nm so that the birefringent body satisfying $N_z<0$ may exhibit the effect of compensating the front retardation of the support layer in the thickness direction. Above all, when the polarizer comprises the support layer on a surface contacting with the birefringent body satisfying $N_z<0$, such adjustment of the front retardation $R_{th}$ in the thickness direction is preferably performed. In addition, the front retardation of the support layer in the thickness direction is generally within a range of +20 to +80 nm. According to the configuration (6), a preferable lower limit of the sum of the front retardation $R_{th}$ of the birefringent body satisfying $N_z<0$ in the thickness direction and the front retardation of the support layer in the thickness direction is $-120$ nm and its preferable upper limit is $-40$ nm.

In addition, according to the example embodiment, preferably, the front retardation $R_{th}$ of the birefringent body satisfying $N_z<0$ in the thickness direction is appropriately adjusted depending on the front retardation of the layer having the front retardation in the thickness direction in the circularly polarizing plate.

Furthermore, in the configurations (3) and (4), more preferable are (7) A configuration wherein the λ/2 retarder and/or the λ/4 retarder satisfy $0.8 \leq N_z \leq 2$, and front retardation $R_{th}$ in a thickness direction of the birefringent body satisfying $N_z<0$ satisfies $-220$ nm$\leq R_{th} \leq -40$ nm, and (8) A configuration wherein the polarizer comprises a support layer having front retardation $R_{th}$ in a thick direction of more than 0, the λ/2 retarder and/or the λ/4 retarder satisfy $0.8 \leq N_z \leq 2$, and front retardation $R_{th}$ in a thickness direction of the birefringent body in satisfying $N_z<0$ satisfies $-300$ nm$\leq R_{th} \leq -60$ nm.

These configurations (7) and (8) are suitable in the case where the circularly polarizing plate according to the example embodiment is disposed on the display side of the liquid crystal display panel, and the circularly polarizing plate comprising the polarizer and the λ/4 retarder satisfying $N_z>0$ is disposed on the backlight side.

According to the configuration (7), since the birefringent body satisfying $N_z<0$ is constituted so as to satisfy $-220$ nm$\leq R_{th} \leq -40$ nm, the viewing angle dependence caused by the λ/2 retarder and/or the λ/4 retarder and the circularly polarizing plate disposed on the backlight side, may be sufficiently compensated. Above all, the viewing angle dependence of the retarder adjacent to the birefringent body satisfying $N_z<0$ may be more sufficiently compensated. A lower limit of the front retardation $R_{th}$ in the thickness direction of the birefringent body satisfying $N_z<0$ having the configuration (7) is preferably $-180$ nm, and its upper limit is preferably $-70$ nm.

According to the configuration (8), the polarizer comprises a support layer having front retardation $R_{th}$ in the thick direction of more than 0, and the front retardation $R_{th}$ in the thickness direction of the birefringent body satisfying $N_z<0$ satisfies $-300$ nm$\leq R_{th} \leq -60$ nm so that the birefringent body satisfying $N_z<0$ may exhibit the effect of compensating the front retardation of the support layer in the thickness direction. Above all, when the polarizer comprises the support layer on a surface contacting with the birefringent body satisfying $N_z<0$, such adjustment of the front retardation $R_{th}$ in the thickness direction is more preferably performed. In the configuration (8), a preferable lower limit of the sum of the front retardation $R_{th}$ of the birefringent body satisfying $N_z<0$ in the thickness direction and the front retardation of the support layer in the thickness direction is $-220$ nm and its preferable upper limit is $-70$ nm.

Furthermore, in the configurations (3) and (4), more preferable are (9) A configuration wherein the λ/2 retarder and/or the λ/4 retarder satisfy $0.8 \leq N_z \leq 2$, and front retardation $R_{th}$ in a thickness direction of the birefringent body satisfying $N_z<0$ satisfies $-280$ nm$\leq R_{th} \leq -40$ nm, and

(10) A configuration
wherein the polarizer comprises a support layer having front retardation $R_{th}$ in a thick direction of more than 0, the λ/2 retarder and/or the λ/4 retarder satisfy $0.8 \leq N_z \leq 2$, and front retardation $R_{th}$ in a thickness direction of the birefringent body satisfying $N_z<0$ satisfies $-360$ nm $\leq R_{th} \leq -60$ nm.

These configurations (9) and (10) are suitable in the case where the circularly polarizing plate according to the example embodiment is disposed on the backlight side of the liquid crystal display panel and the circularly polarizing plate comprising the polarizer and the λ/4 retarder satisfying $N_z>0$, is disposed on the display side.

According to the configuration (9), since the birefringent body satisfying $N_z<0$ is constituted so as to satisfy $-280$ nm $\leq R_{th} \leq -40$ nm, the viewing angle dependence caused by the λ/2 retarder and/or the λ/4 retarder and the circularly polarizing plate disposed on the display side, may be sufficiently compensated. Above all, the viewing angle dependence of the retarder adjacent to the birefringent body satisfying $N_z<0$ may be sufficiently compensated. A lower limit of the front retardation $R_{th}$ in the thickness direction of the birefringent body satisfying $N_z<0$ having the configuration (9) is preferably $-240$ nm, and its upper limit is preferably $-70$ nm.

According to the configuration (10), the polarizer comprises the support layer having front retardation in the thickness direction of more than 0, and the front retardation $R_{th}$ in the thickness direction of the birefringent body satisfying $N_z<0$ satisfies $-360$ nm $\leq R_{th} \leq -60$ nm so that the birefringent body satisfying $N_z<0$ may exhibit the effect of compensating the front retardation of the support layer in the thickness direction. Above all, when the polarizer comprises the support layer on a surface contacting with the birefringent body satisfying $N_z<0$, such adjustment of the front retardation $R_{th}$ in the thickness direction is more preferably performed. In the configuration (10), a preferable lower limit of the sum of the front retardation $R_{th}$ of the birefringent body satisfying $N_z<0$ in the thickness direction and the front retardation of the support layer in the thickness direction is $-240$ nm and its preferable upper limit is $-70$ nm.

The example embodiment presented herein also relates to the liquid crystal display device, wherein the circularly polarizing plate according to the configuration (5) or (6) is disposed on each side of a liquid crystal display panel, the liquid crystal display device, wherein the circularly polarizing plate according to the configuration (7) or (8) is disposed on a display side of a liquid crystal display panel, and the liquid crystal display device wherein the circularly polarizing plate according to configuration (9) or (10) is disposed on a backlight side of a liquid crystal display panel.

In the liquid crystal display devices, since the light incident from the perpendicular direction and the light incident from the oblique direction may be circularly polarized by disposing the circularly polarizing plate comprising the birefringent body satisfying $N_z<0$ provided on the liquid crystal layer side of the polarizer, display having a wider viewing angle may be realized.

It is preferable that liquid crystal molecules constituting a liquid crystal layer in the liquid crystal display panel are aligned so as to be substantially vertical to a substrate at a voltage less than a threshold voltage.

This vertically aligned (VA) liquid crystal display device is excellent in contrast of the display, and sufficiently exhibits the effect of the example embodiment or the effect of compensating viewing angle dependence, and performs the wider viewing angle of the display. In addition, in the example embodiment, "liquid crystal molecules are aligned so as to be substantially vertical to a substrate" preferably means that the liquid crystal molecules are in a state considered to be substantially aligned perpendicular to the substrate in the liquid crystal layer, and contains as a similar configuration thereto, a state in which liquid crystal molecules have a predetermined angle to the substrate unless the effect of the present invention are sacrificed.

In addition, the circularly polarizing plate may be applied to a homogeneous aligned semitransparent liquid crystal display device.

And as the liquid crystal display device of the example embodiment presented herein, a semitransparent liquid crystal display device is suitable. As a display method of the liquid crystal display device of the example embodiment, a normally black method is suitable. Above all, a constitution in which liquid crystal materials having negative dielectric anisotropy are aligned so as to be substantially vertical to a substrate at a voltage less than a threshold voltage, between a pair of polarizing plates disposed in cross-Nicol state. Alternatively, the liquid crystal display device of the example embodiment may comprise a configuration in which liquid crystal materials having positive dielectric anisotropy, or may be a transparent liquid crystal display device performing only transparent display, or may comprise no λ/2 retarder.

Since the circularly polarizing plate of the example embodiment comprises the above mentioned constitution, use of the birefringent body satisfying $N_z<0$ may compensate the viewing angle dependence caused by the retarder satisfying $N_z>0$, and the light incident from the perpendicular direction and the light incident from the oblique direction may be circularly polarized. Use of such the circularly polarizing plate of the example embodiment enables the wider viewing display of the display devices such as the liquid crystal display device.

The example embodiment presented herein will, hereinafter, be described in detail with reference to Embodiments on a basis of the drawings, but the present invention is not limited to only Embodiments.

EMBODIMENT 1

Figure 8A:
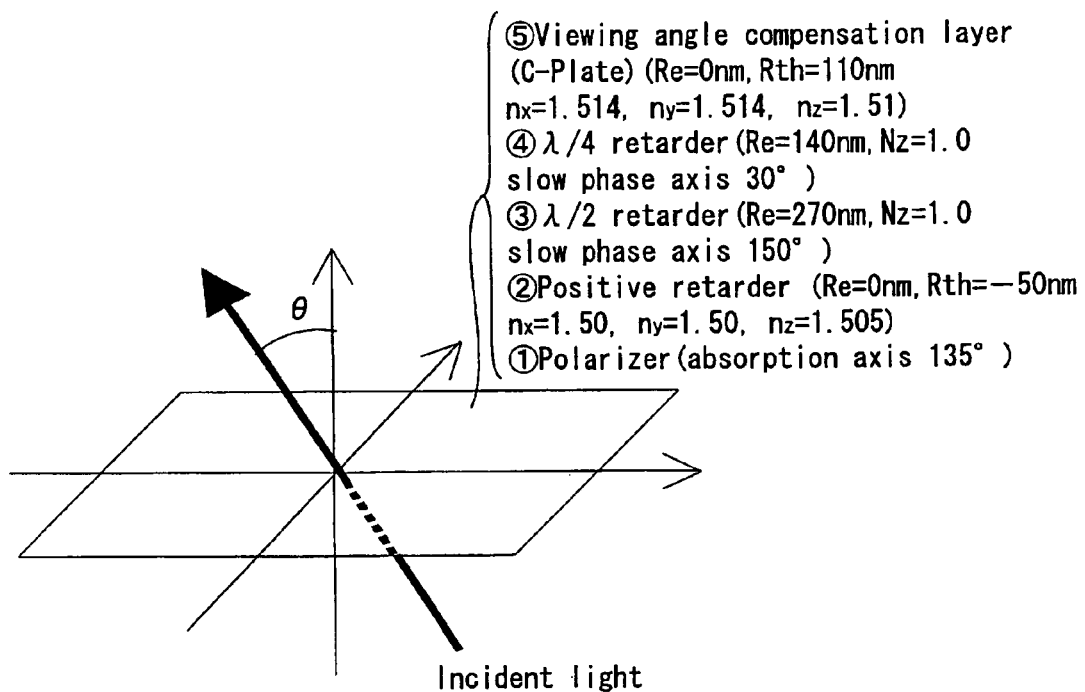
FIG. 8a is an explanatory diagram schematically illustrating pass of light having an elevation angle θ through a circularly polarizing plate according to Embodiment 1 disposed on a backlight side. Wherein circled numerals show an order in which the light enters each member.
Figure 8B:
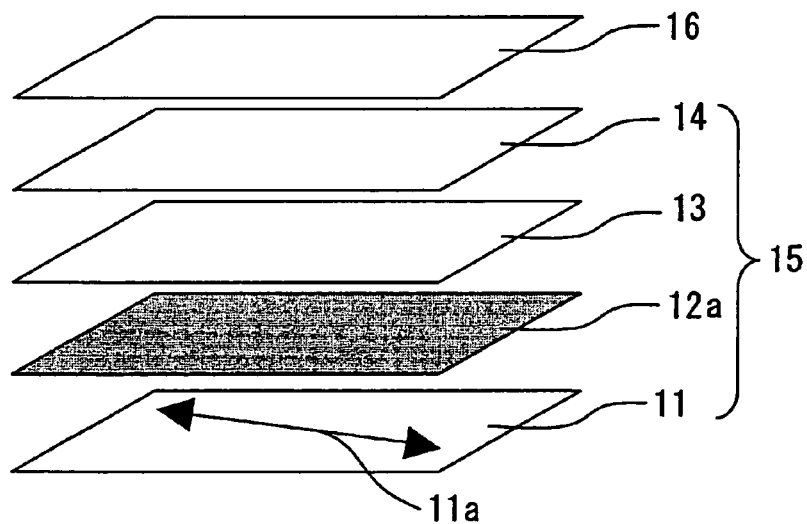
Figure 12A:
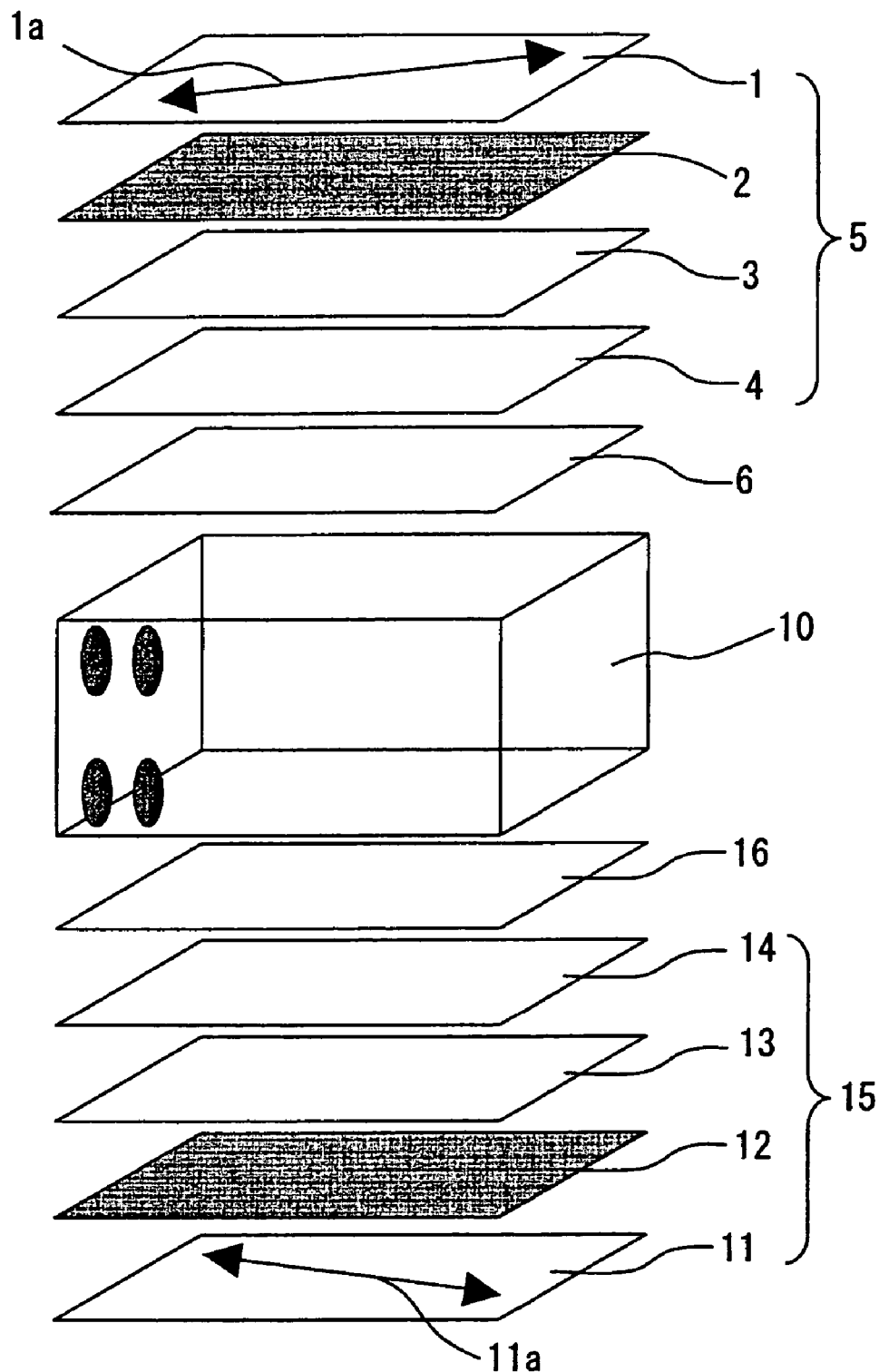
FIG. 12a is a perspective exploded view schematically illustrating a constitution of a liquid crystal display panel according to Embodiment 2.

FIGS. 8a and 8b schematically illustrate light incident at an elevation angle θ on a circularly polarizing plate disposed on the backlight side in a liquid crystal display panel having a constitution illustrated in FIG. 12a. Circled numerals (1 to 5) in FIG. 8a show an order in which the light is made incident.

Figure 9:
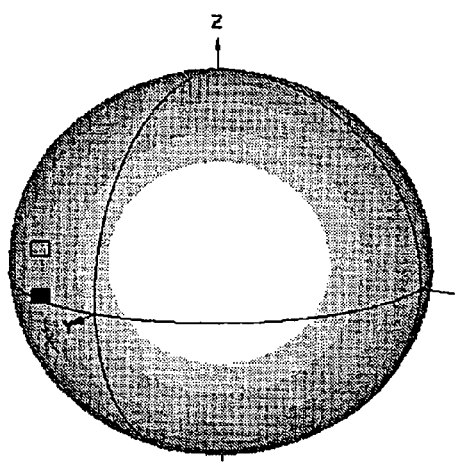
FIG. 9 is an explanatory diagram showing, by Poincare sphere, a polarized state of light after passing through the positive retarder in the circularly polarizing plate according to Embodiment 1.
Figure 10:
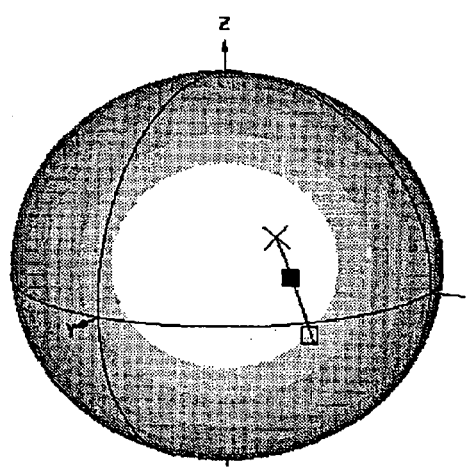
FIG. 10 is an explanatory diagram showing, by Poincare sphere, a polarized state of light after passing through the λ/2 retarder in the circularly polarizing plate according to Embodiment 1.

The light passes through a circularly polarizing plate 15 having a constitution according to Embodiment 1 at the elevation angle θ (=60°) as illustrated in FIGS. 8a and 8b. FIG. 9 shows a polarized state of the light after passing through a polarizer 11 and a positive retarder (positive birefringent body having a light axis in a thickness direction) 12a, and FIG. 10 shows a polarized state of the light after passing through a λ/2 retarder 13. In addition, in FIGS. 9 and 10, shown together for reference is polarized state in a configuration wherein a film having positive front retardation in the thickness direction typified by a triacethylcellulose (TAC) film used for a support layer of a polarizer 11 is added instead of the positive retarder 12a. FIG. 10 shows that addition of the positive retarder 12a makes the polarized state after passing through the λ/2 retarder 13 more similar to the linearly polarized light.

A contrast change (contrast curve) was measured using the elevation angle θ of the incident light as a parameter in the constitution of Embodiment 1 illustrated in FIGS. 8a and 8b. Result thereof is shown in FIG. 8c. Also a constitution in which the positive retarder 12a is removed from that of Embodiment 1 is a constitution of Comparative Example, FIG. 8c shows contrast in Comparative Example together for reference.

FIG. 8c shows that in Embodiment 1 the contrast has smaller reduction even when the elevation angle θ is increased, and that a display quality in the oblique direction is superior as compared with Comparative Example.

In addition, in the constitution of Embodiment 1 illustrated in FIGS. 8a and 8b, a light amount leaking at the elevation angle θ=60° in 6 o'clock direction at the time of displaying black was calculated in simulation using the front retardation $R_{th}$ of the positive retarder 12a in the thickness direction as a parameter. Result thereof is shown in FIG. 11.

Figure 11:
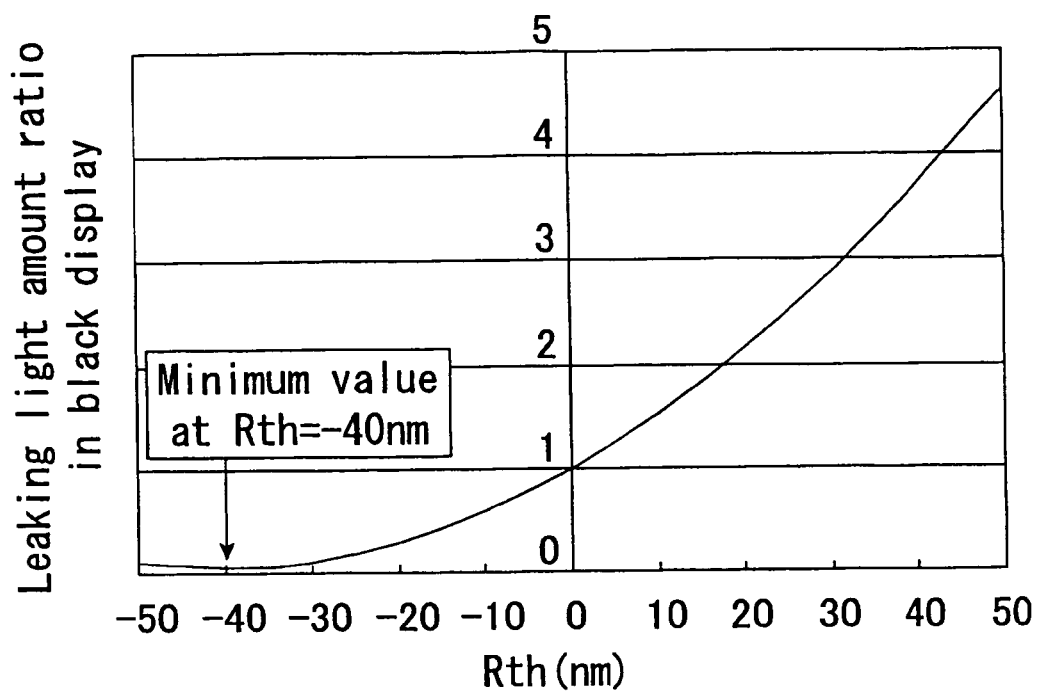
FIG. 11 is a graph showing a relation between front retardation $R_{th}$ of the positive retarder in a thickness direction and a leaking light amount at the time of the display of black in the Embodiment 1. And a leaking light amount is defined as 1 when circularly polarizing plate has no positive retarder.

As shown in FIG. 11, the leaking light amount at the time of displaying black is minimum when $R_{th}$ is −40 nm, and it was confirmed that the viewing angle was increased by the positive retarder 12a. However, when the TAC film having the front retardation of 30 to 60 nm is used as the support layer of the polarizer 11, use of the positive retarder 12a having $R_{th}$ Of about −80 nm is needed in order to compensate the front retardation of the TAC film.

In addition, the front retardation $R_{th}$ of the positive retarder 12a in the thickness direction in which the leaking light amount is a minimum becomes a different value by changing the constitution of the circularly polarizing plate 15. For example, it has been found that when axis settings of the λ/2 retarder 13 and the λ/4 retarder 14 are changed, the leaking light amount in the black display becomes the minimum in the vicinity of $R_{th}$=−80 nm.

EMBODIMENT 2

Figure 12B:
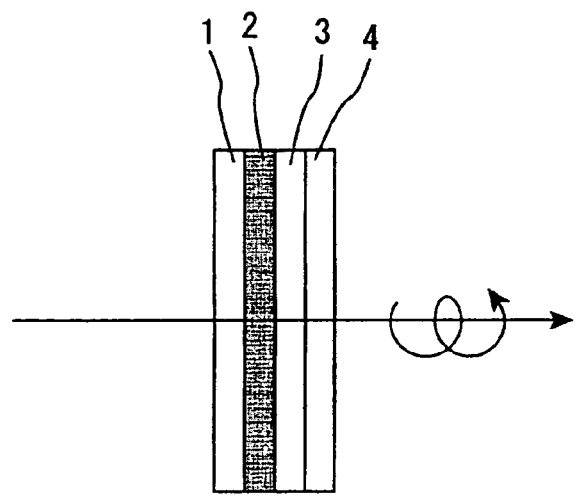
FIG. 12b is a sectional schematic view illustrating a constitution of a circularly polarizing plate according to Embodiment 2.
Figure 13:
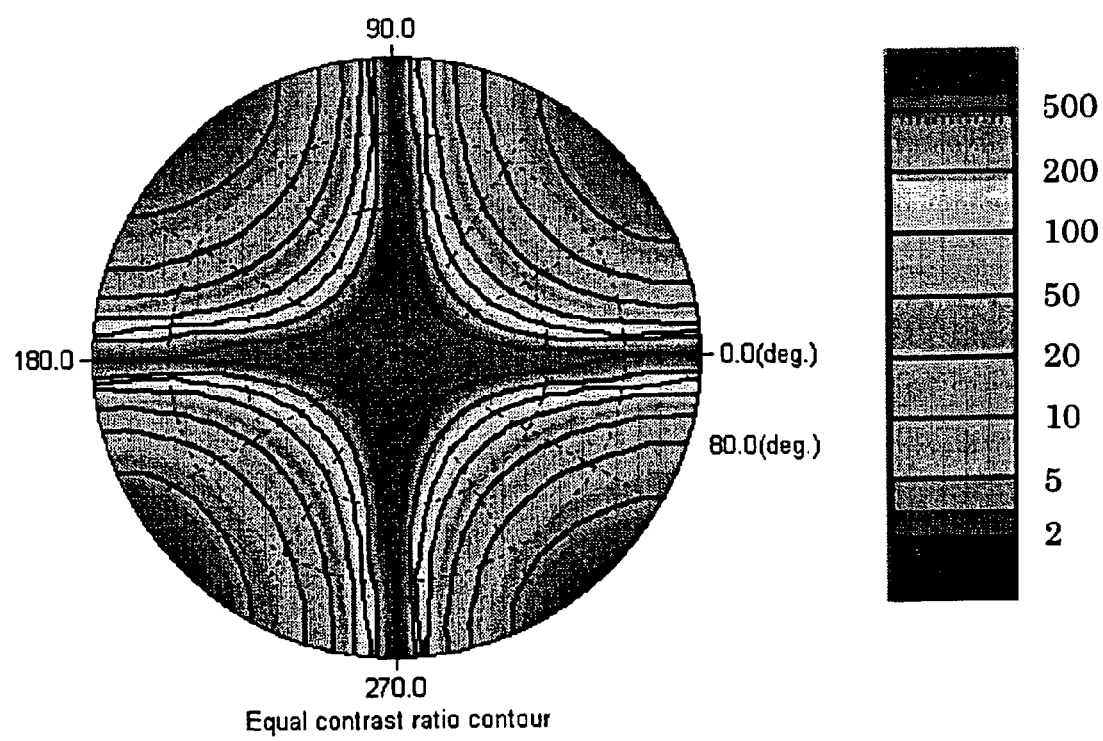
FIG. 13 is an equal contrast ratio contour plan showing a calculation result of transmission contrast of the liquid crystal display panel according to Embodiment 2.

FIG. 12a is a perspective exploded view schematically illustrating a constitution of the liquid crystal display panel according to Embodiment 2, and FIG. 12b is a sectional schematic view illustrating a constitution of a circularly polarizing plate according to Embodiment 2. Calculated was the liquid crystal display panel having the constitution illustrated in FIG. 12a for a viewing angle characteristic. The liquid crystal display panel illustrated in FIG. 12a comprises the circularly polarizing plate 5, the viewing angle compensation layer (C-Plate) 6, the semitransparent vertically aligned (VA) liquid crystal cell 10, the viewing angle compensation layer (C-Plate) 16, the circularly polarizing plate 15 in this order from the display side. The circularly polarizing plates 5d is posed on the display side and the circularly polarizing plates 15 disposed on the backlight side comprise the polarizers 1 and 11, the positive retarders (birefringent bodys satisfying $N_z$<0) 2 and 12, the λ/2 retarders 3 and 13, and the λ/4 retarders 4 and 14, respectively. The liquid crystal cell 10 has an optical axis perpendicular to a substrate and has positive optical activity. Each of the viewing angle compensation layers 6 and 16 has an optical axis perpendicular to the substrate and has negative optical activity. Each of the positive retarders 2 and 12 has an optical axis perpendicular to the substrate (each of planes of the polarizers 1 and 11) and has positive optical activity. Characteristics and arrangements of the polarizing plates (the circularly polarizing plates 5 and 15 and the viewing angle compensation layers 6 and 16) used in calculation of the viewing angle characteristic are shown in Table 1. And the calculation result of the viewing angle characteristic is shown in FIG. 13.

EMBODIMENT 3

Figure 14:
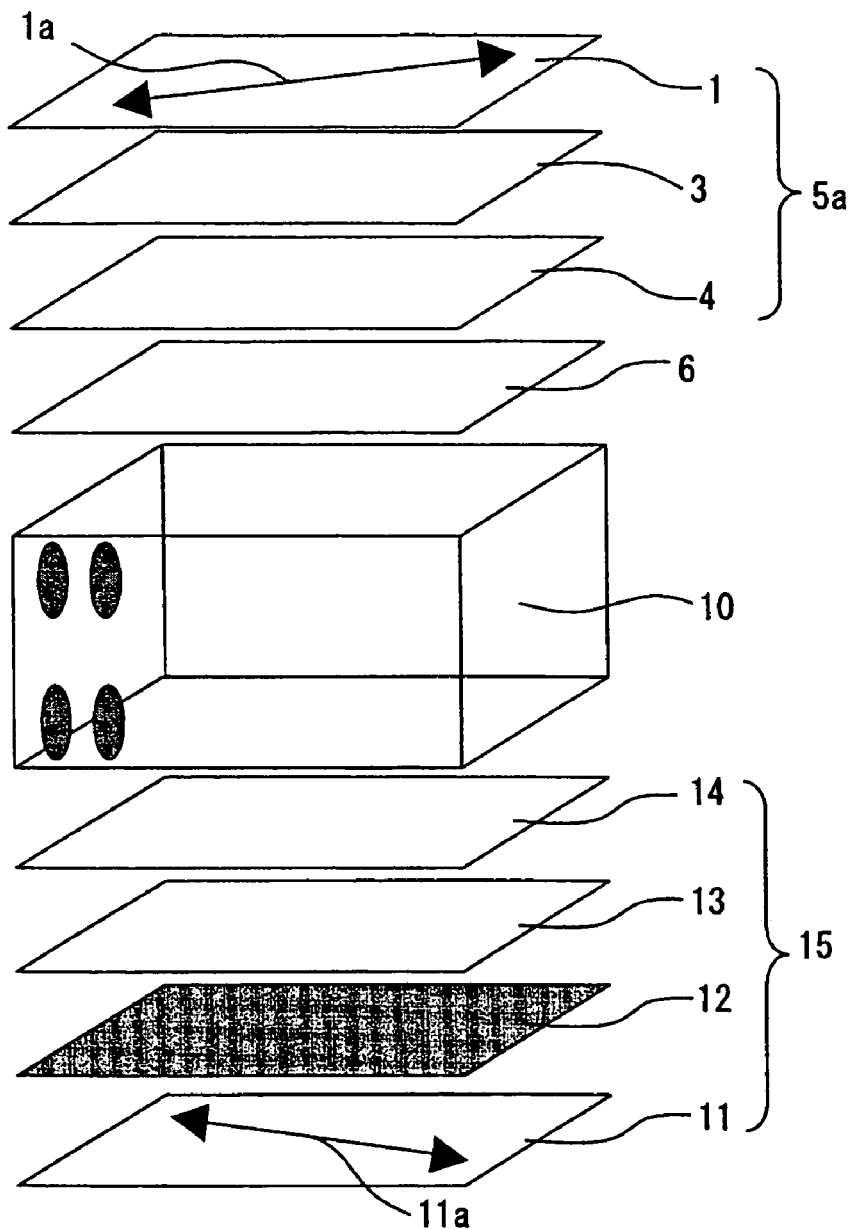
FIG. 14 is a perspective exploded view schematically illustrating a constitution of a liquid crystal display panel according to Embodiment 3.
Figure 15:
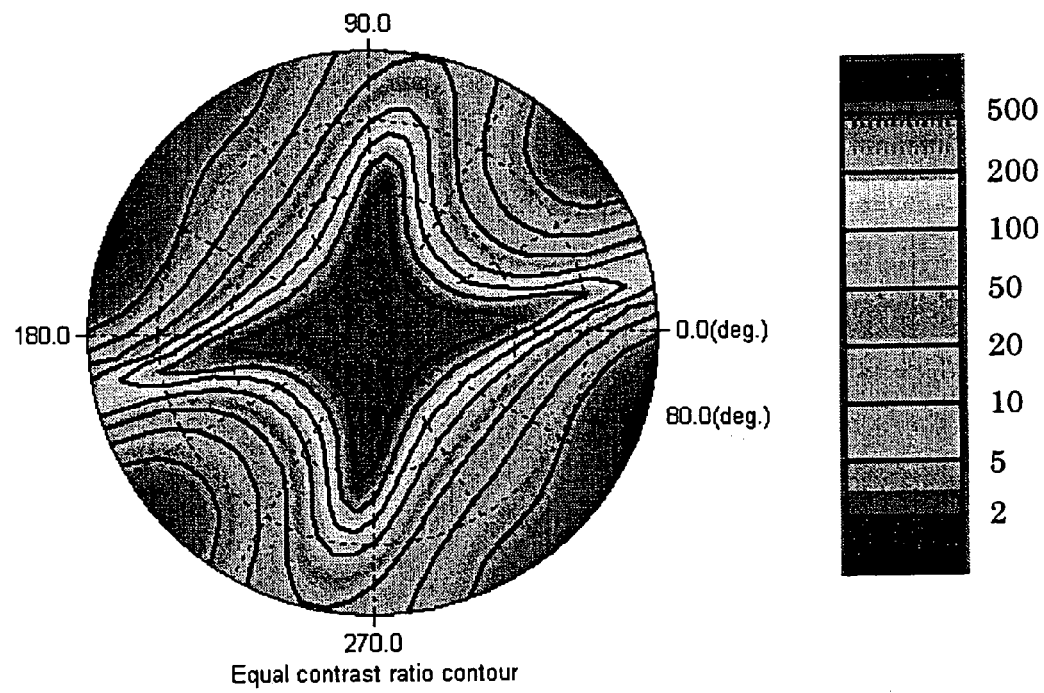
FIG. 15 is an equal contrast ratio contour plan showing a calculation result of transmission contrast in the liquid crystal display panel according to Embodiment 3.

FIG. 14 is a perspective exploded view schematically illustrating a constitution of the liquid crystal display panel according to Embodiment 3. The liquid crystal display panel having the constitution illustrated in FIG. 14 was calculated for a viewing angle characteristic. The liquid crystal display panel illustrated in FIG. 14 comprises the circularly polarizing plate 5a, the viewing angle compensation layer (C-Plate) 6, the semitransparent vertically aligned (VA) liquid crystal cell 10, and the circularly polarizing plate 15 in this order from the display side. The circularly polarizing plate 5a disposed on the display side comprises the polarizer 1, the λ/2 retarder 3 and the λ/4 retarder 4. The circularly polarizing plate 15 disposed on the backlight side comprises the polarizer 11, the positive retarder (positive birefringent body having an optical axis in the thickness direction) 12, the λ/2 retarder 13, and the λ/4 retarder 14. In Embodiment 3, in order to increase the viewing angle of only transparent display at the expense of the viewing angle of reflection display to some extent, the positive retarder 12 having a large front retardation $R_{th}$ in the thickness direction is used only one side of the liquid crystal cell 10 and the characteristics and arrangements of the polarizing plates (the circularly polarizing plates 5a and 15 and the viewing angle compensation layer 6) are partially changed as compared with that in Embodiment 2 as shown in Table 1 and a viewing angle characteristic was calculated. Calculation result of the viewing angle characteristic is shown in FIG. 15.

COMPARATIVE EXAMPLE 1

Figure 16:
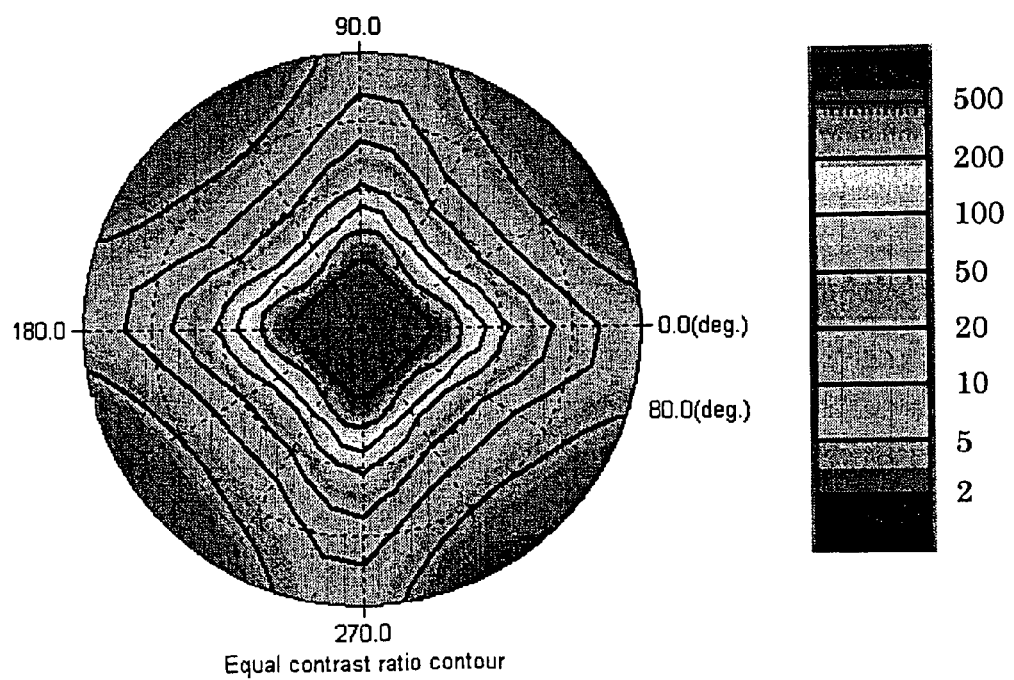
FIG. 16 is an equal contrast ratio contour plan showing a calculation result of transmission contrast of a liquid crystal display panel according to Comparative example 1.

A viewing angle characteristic was calculated in a liquid crystal display panel having the same constitution as that of Embodiment 2 except that no positive retarder (birefringent body satisfying $N_z$<0) is provided between the polarizer and the λ/2 retarder in each of the circularly polarizing plate disposed on the display side and the circularly polarizing plate disposed on the backlight side. The characteristics and arrangements of the polarizing plates (the circularly polarizing plate and the viewing angle compensation layer) are partially changed as compared with that in Embodiment 2 and a viewing angle characteristic was calculated as shown in Table 1. Calculation result of the viewing angle characteristic is shown in FIG. 16.

TABLE 1

Characteristics and Arrangements

| | Front (display side) | Back (backlight side) |
|---|---|---|
| Embodiment 2 |  ① Polarizer: 45°<br>② PR (Re = 0 nm, Rth = -70 nm) $n_x = 1.5, n_y = 1.5, n_z = 1.505$<br>③ Retarder (Re = 270 nm, Nz = 1.0): S60°<br>④ Retarder (Re = 140 nm, Nz = 1.0): S120°<br>⑤ C-Plate (Re = 0 nm, Rth = 110 nm) $n_x = 1.514, n_y = 1.514, n_z = 1.51$ |  ⑥ C-Plate (Re = 0 nm, Rth = 110 nm) $n_x = 1.514, n_y = 1.514, n_z = 1.51$<br>⑦ Retarder (Re = 140 nm, Nz = 1.0): S30°<br>⑧ Retarder (Re = 270 nm, Nz = 1.0): S150°<br>⑨ PR (Re = 0 nm, Rth = -70 nm) $n_x = 1.5, n_y = 1.5, n_z = 1.505$<br>⑩ Polarizer: 135° |
| Embodiment 3 |  ① Polarizer: 45°<br>② Retarder (Re = 270 nm, Nz = 1.0): S60°<br>③ Retarder (Re = 140 nm, Nz = 1.0): S120°<br>④ C-Plate (Re = 0 nm, Rth = 220 nm) $n_x = 1.514, n_y = 1.514, n_z = 1.51$ | 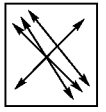 ⑤ Retarder (Re = 140 nm, Nz = 1.0): S30°<br>⑥ Retarder (Re = 270 nm, Nz = 1.0): S150°<br>⑦ PR (Re = 0 nm, Rth = -120 nm) $n_x = 1.5, n_y = 1.5, n_z = 1.505$<br>⑧ Polarizer: 135° |
| Comparative 1 |  ① Polarizer: 20°<br>② Retarder (Re = 270 nm, Nz = 1.0): S35°<br>③ Retarder (Re = 140 nm, Nz = 1.0): S95°<br>④ C-Plate (Rth = 110 nm) $n_x = 1.514, n_y = 1.514, n_z = 1.51$ | 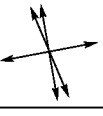 ⑤ C-Plate (Rth = 110 nm) $n_x = 1.514, n_y = 1.514, n_z = 1.51$<br>⑥ Retarder (Re = 140 nm, Nz = 1.0): S5°<br>⑦ Retarder (Re = 270 nm, Nz = 1.0): S125°<br>⑧ Polarizer: 110° |

In Table 1, all of the axis angles are seen from the display side and 3 o'clock direction is set at 0° and an angle degree is increased counterclockwise. Serial numbers show order from the display side. And $R_{th}$ (30 nm) of the TAC film as the support layer of the polarizer is considered in the calculation in the Embodiments 2 and 3 and Comparative Example 1, but it is not shown in Table 1.

As shown in FIGS. 13, 15 and 16, in Embodiment 2, the viewing angles are increased in the horizontal and the vertical direction by using the birefringent body satisfying $N_z<0$ in the polarizing plate on each of the display side and the backlight side, as compared with those in Comparative Example 1. Also, in the Embodiment 3, the effect of compensating the viewing angle is observed by using the birefringent body satisfying $N_z<0$ in the circularly polarizing plate on the backlight side.

Figure 17:
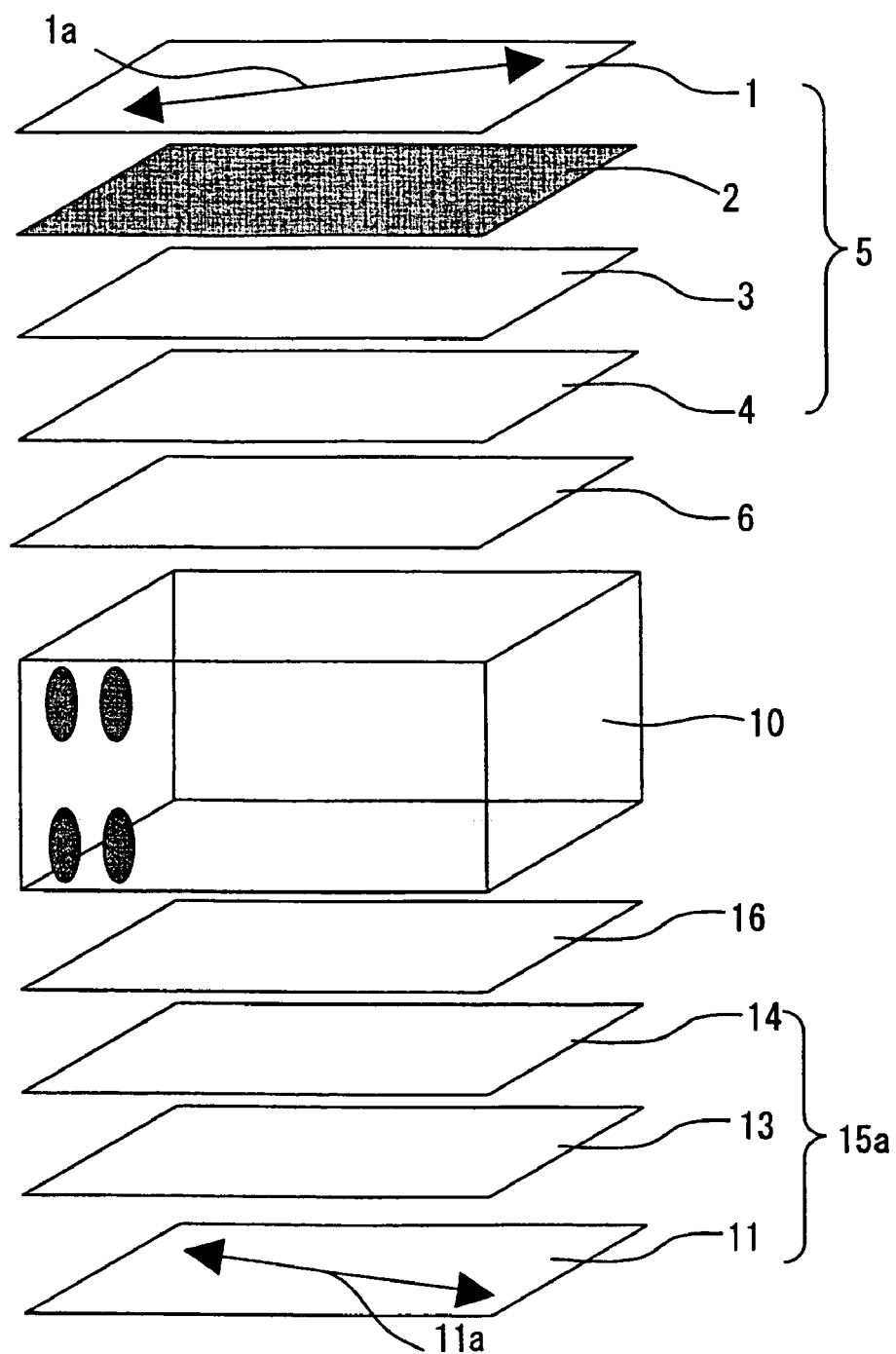
FIG. 17 is perspective exploded view schematically illustrating an example of a constitution of a liquid crystal display panel according to the present invention.

In addition, when the liquid crystal display device having a constitution illustrated in FIG. 17 was calculated for the viewing angle characteristic, a result similar to that in Embodiment 2 may be provided.

The invention claimed is:

1. A liquid crystal display device comprising a circularly polarizing plate, a liquid crystal display panel and a backlight,
    wherein the circularly polarizing plate includes a polarizer and an optical layer having a value of $N_z$ shown by the following equation (1),
    wherein the circularly polarizing plate includes a birefringent body satisfying $N_z<0$ between the polarizer and a retarder satisfying $N_z>0$, $$N_z=(n_x-n_z)/(n_x-n_y) \quad (1)$$

where $n_x$ and $n_y$ designate main refractive indexes in a plane to light having a wavelength of 550 nm and satisfy $n_x \geq n_y$, and $n_z$ designates a main refractive index in a thickness direction to the light having the wavelength of 550 nm,
    wherein the retarder satisfying $N_z>0$ comprises a λ/4 retarder,
    wherein the λ/4 retarder satisfies $0.8 \leq N_z \leq 2$, and
    front retardation $R_{th}$ in a thickness direction of the birefringent body satisfying $N_z<0$ satisfies $-280$ nm$\leq R_{th} \leq -40$ nm, and
    wherein the circularly polarizing plate is disposed only on the backlight side of the liquid crystal display panel.

2. The liquid crystal display device according to claim 1, wherein in-plane retardation Re of the birefringent body satisfying $N_z<0$ is 50 nm or less.

3. The liquid crystal display device according to claim 1, wherein in the birefringent body satisfying $N_z<0$, in-plane retardation Re satisfies 50 nm$\leq$Re$\leq$150 nm, and
    an angle P1 formed between an optical axis in a plane of the birefringent body and an absorption axis of the adjacent polarizer satisfies one of 85°$\leq$P1$\leq$95° and 0°$\leq$P1$\leq$5°.

4. The liquid crystal display device according to claim 1, wherein the retarder satisfying $N_z>0$ further comprises a λ/2 retarder.

5. The liquid crystal display device according to claim 4, wherein an angle P2 formed between optical axes of the λ/2 retarder and the λ/4 retarder satisfies 50°<P2<70°.

6. The liquid crystal display device according to claim 1, wherein the polarizer comprises a support layer having front retardation $R_{th}$ in a thick direction of more than 0, the λ/4 retarder satisfies $0.8 \leq N_z \leq 2$, and
    front retardation $R_{th}$ in a thickness direction of the birefringent body satisfying $N_z<0$ satisfies $-220$ nm$\leq R_{th} \leq -40$ nm.

7. The liquid crystal display device according to claim 4, wherein the polarizer comprises a support layer having front retardation $R_{th}$ in a thick direction of more than 0, the λ/2 retarder and the λ/4 retarder satisfy $0.8 \leq N_z \leq 2$, and front retardation $R_{th}$ in a thickness direction of the birefringent body satisfying $N_z<0$ satisfies $-220\ \text{nm} \leqq R_{th} \leqq -40\ \text{nm}$.

8. The liquid crystal display device according to claim 4, wherein the λ/2 retarder and the λ/4 retarder satisfy $0.8 \leqq N_z \leqq 2$, and
front retardation $R_{th}$ in a thickness direction of the birefringent body satisfying $N_z<0$ satisfies $-280\ \text{nm} \leqq R_{th} \leqq -40\ \text{nm}$.

9. The liquid crystal display device according to claim 1,
wherein liquid crystal molecules constituting a liquid crystal layer in the liquid crystal display panel are aligned so as to be substantially vertical to a substrate at a voltage less than a threshold voltage.

* * * * *